Sept. 1, 1970           A. E. SHECKELLS           3,526,820
QUARTERLINE STOP POSITION CONTROL CIRCUIT FOR POWER DRIVEN
REVOLVING DOORS UTILIZING TWO SPEEDS
Filed June 14, 1968           4 Sheets-Sheet 1
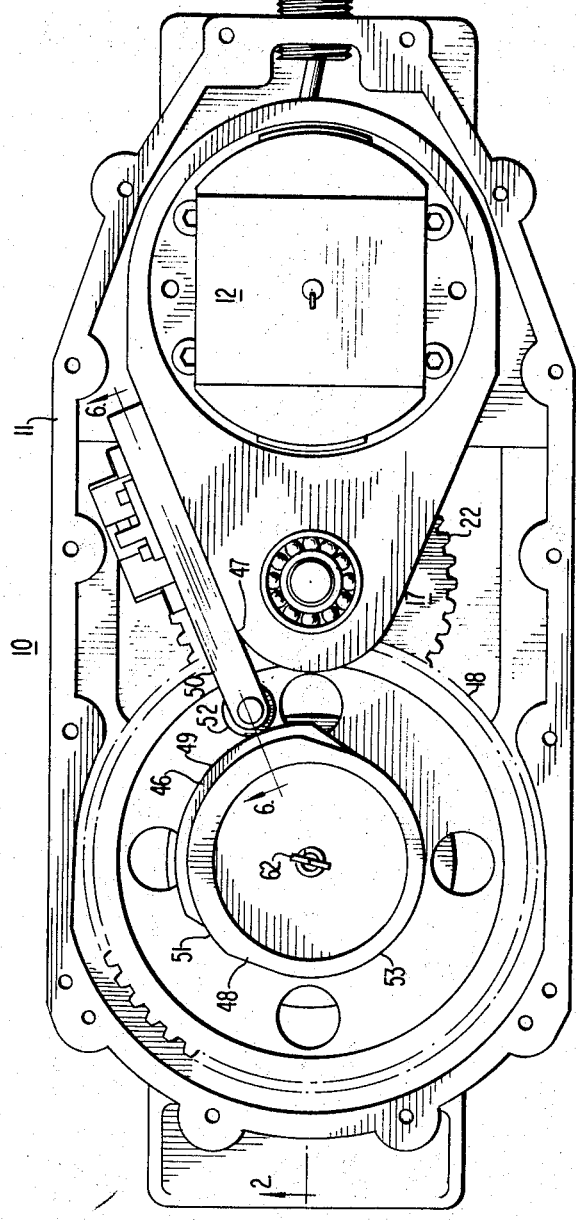
INVENTOR
AMUEL E. SHECKELLS
BY *Brady, O'Boyle & Gates*
ATTORNEYS Sept. 1, 1970  A. E. SHECKELLS  3,526,820
QUARTERLINE STOP POSITION CONTROL CIRCUIT FOR POWER DRIVEN
REVOLVING DOORS UTILIZING TWO SPEEDS
Filed June 14, 1968  4 Sheets-Sheet 2
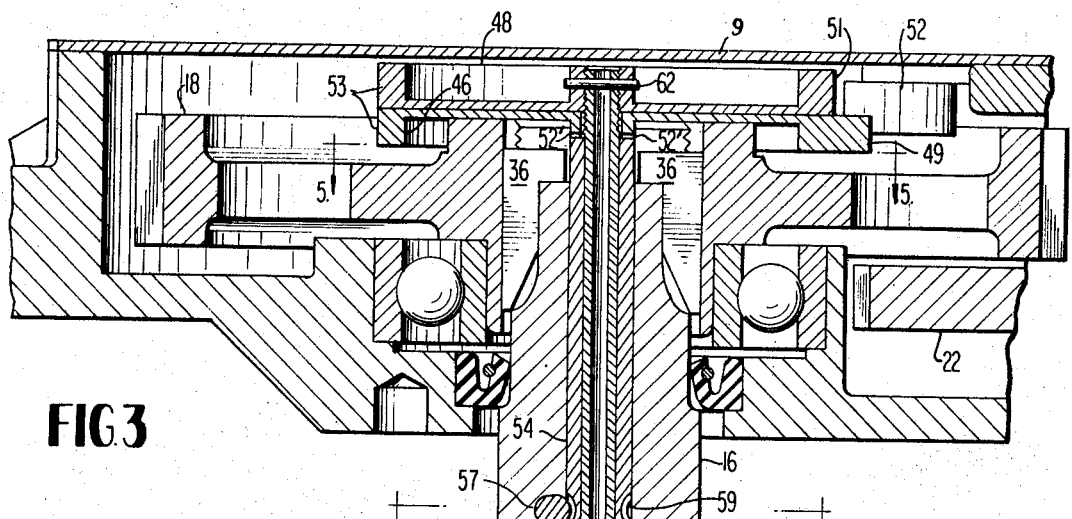
FIG. 3
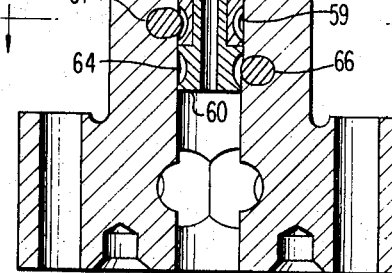
FIG. 4
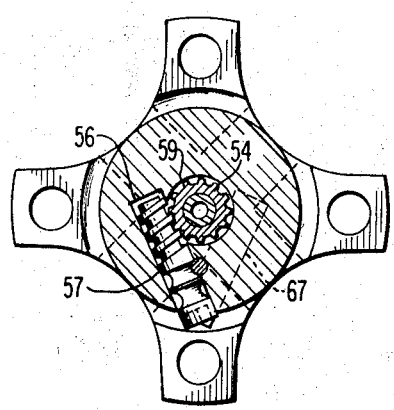
FIG. 5
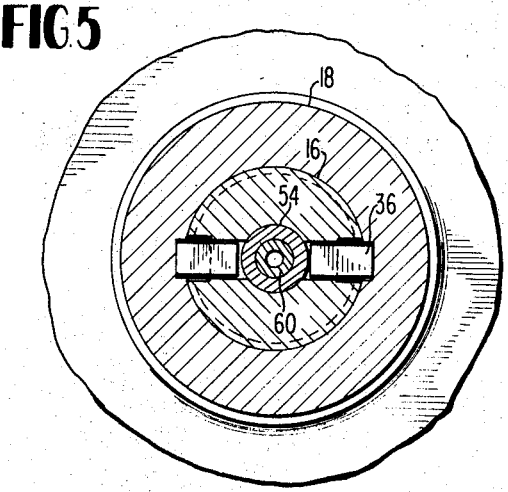
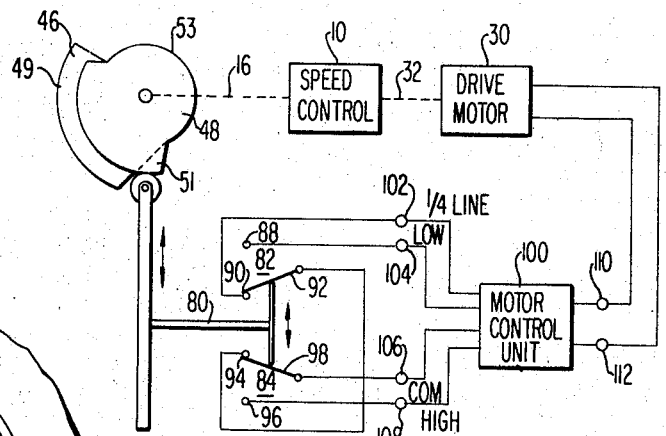
FIG. 8
INVENTOR
AMUEL E. SHECKELLS
BY Brady, O'Boyle & Gates
ATTORNEYS Sept. 1, 1970　　　　　A. E. SHECKELLS　　　　　3,526,820
QUARTERLINE STOP POSITION CONTROL CIRCUIT FOR POWER DRIVEN
REVOLVING DOORS UTILIZING TWO SPEEDS
Filed June 14, 1968　　　　　　　　　　　　　　　　4 Sheets-Sheet 3

INVENTOR

AMUEL E. SHECKELLS

BY  *Brady, O'Boyle & Gates*

ATTORNEYS

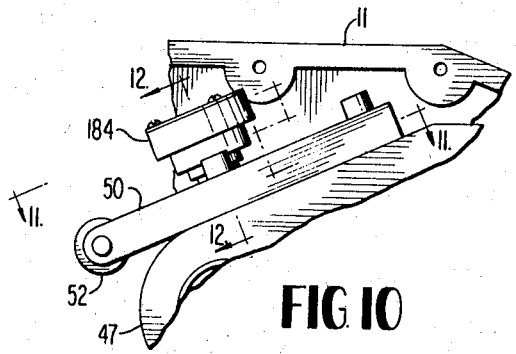
FIG.10
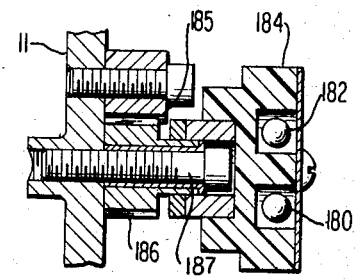
FIG.12
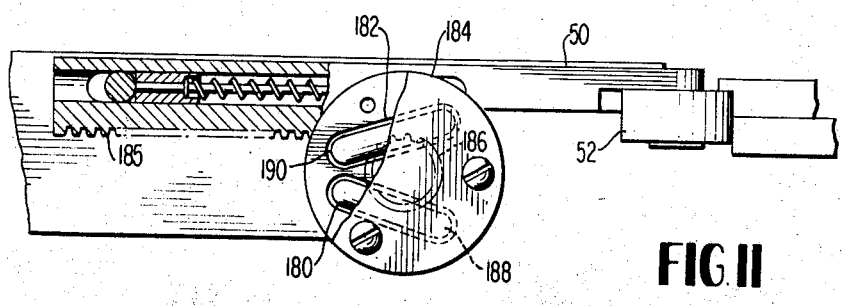
FIG.11
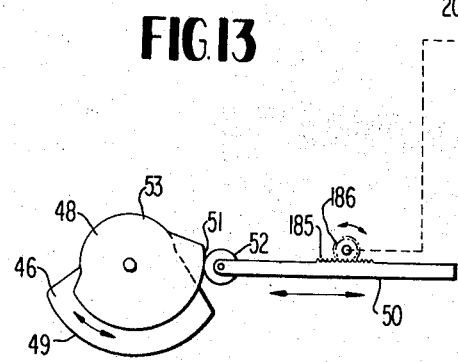
FIG.13
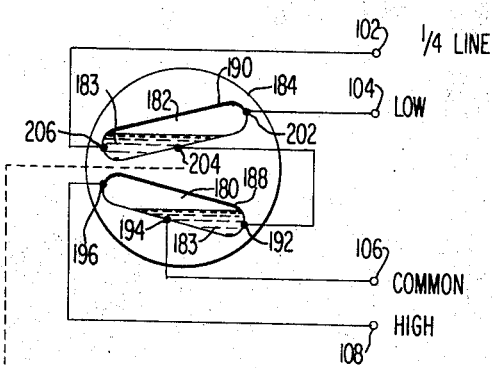

United States Patent Office 3,526,820
Patented Sept. 1, 1970

3,526,820
QUARTERLINE STOP POSITION CONTROL CIRCUIT FOR POWER DRIVEN REVOLVING DOORS UTILIZING TWO SPEEDS
Amuel E. Sheckells, Evansville, Ind., assignor to International Steel Company, Evansville, Ind., a corporation of Indiana
Filed June 14, 1968, Ser. No. 737,190
Int. Cl. G05d 3/08
U.S. Cl. 318—467        11 Claims

ABSTRACT OF THE DISCLOSURE

Apparatus for controlling electrically driven revolving doors to automatically stop the wings at the quarterline position when not in use. When activated by finger-tip pressure or other means from the quarterline position, the wings commence revolving, turning approximately ⅝ of a revolution past the point where the user exits. The door slows down after the user exits and comes to a stop with all four airlock strips of the four door wings touching the enclosure walls.

BACKGROUND OF THE INVENTION

This invention relates to power assisted revolving doors and more particularly to control apparatus therefor. In such apparatus, when a user enters the wings of the revolving doors and closes selected switch means, either by a gentle nudge on the wings, touching a push bar, stepping on a treadle, or breaking a light beam, the door is electrically driven at a predetermined safe walking speed until the user exits.

Control circuits for electrically driven revolving doors are well known to those skilled in the art of which U.S. Pats. 2,954,971 and 3,020,038, issued to A. M. Simpson and assigned to the present assignee, are illustrative examples. Furthermore, speed control mechanisms are illustrated by U.S. Pats. 3,349,876; 3,308,912 and 3,307,660 issued to A. E. Sheckells and also assigned to the assignee of the present invention. The aforementioned speed control mechanisms couple the revolving door shaft to a small electrical drive motor and limit the speed of the revolving doors to a safe walking speed. Moreover, the revolving door operating mechanism and speed control device is integrally designed so that it exhibits a relatively thin, low profile to render the assembly readily adaptable for selective mounting in either overhead or floor-type installations.

SUMMARY

The present invention pertains to a quarterline stop position control circuit for an electrically driven revolving door including a speed controller coupling power from a drive motor to the revolving door shaft, and comprises the combination of: switch means located on the speed controller and having a high speed, low speed and quarterline stop position; switch actuation means coupled to the revolving door shaft, being operable to consecutively actuate said switch means to said high speed, low speed and quarterline stop positions upon initiation of door movement; and drive control circuit means coupled between said switch means and said drive motor to produce a first or high speed control signal for said drive motor in accordance with said high speed switch position for a predetermined portion of a door revolution, a second or low speed control signal when said switch means assumes the low speed switch position for another predetermined portion of the door revolution, and a third or stop motor control signal when said revolving door shaft and the wings attached thereto reach a quarterline position after a substantially full revolution from the initial rest or de-energized position.

BRIEF DESCRIPTION OF THE DRAWINGS

FIG. 1 is a top plan view of a speed controller assembly for a power driven revolving door with the cover plate removed from the housing and additionally including one embodiment of the switch means and actuator therefor;

FIG. 2 is a sectional view taken along the line 2—2 of FIG. 1 showing the door operating mechanism, the clutch and speed control apparatus and switch actuator means coupled to the end of the revolving door shaft;

FIG. 3 is an enlarged fragmentary view of FIG. 2 further illustrating the switch actuator means comprising a pair of cams including adjustment means for manually varying the position of the cam surfaces relative to the angular position of the door shaft;

FIG. 4 is a cross sectional view of the stub shaft shown in FIG. 3 taken along the lines 4—4 illustrating the means for varying the cam positions;

FIG. 5 is a cross sectional view taken along lines 5—5 of FIG. 3 illustrating key members utilized for locking the main gear of the speed controller to the stub shaft;

FIG. 7 is a diagram illustrating the quarterline stop position;

FIG. 8 is a block diagram of the quarterline stop control circuit comprising the first embodiment of the subject invention;

FIG. 10 is a fragmentary plan view of a second embodiment of the switch means utilized in the subject invention;

FIG. 11 is a cross sectional view of the second embodiment of the switch means shown in FIG. 10 taken along the lines 11—11;

FIG. 12 is another sectional view taken along the lines 12—12 of the second embodiment of the switch means shown in FIG. 10; and FIG. 13 is a schematic diagram of the second embodiment of the switch means in combination with the cam actuation means therefor.

DESCRIPTION OF THE PREFERRED EMBODIMENTS

Figure 6:
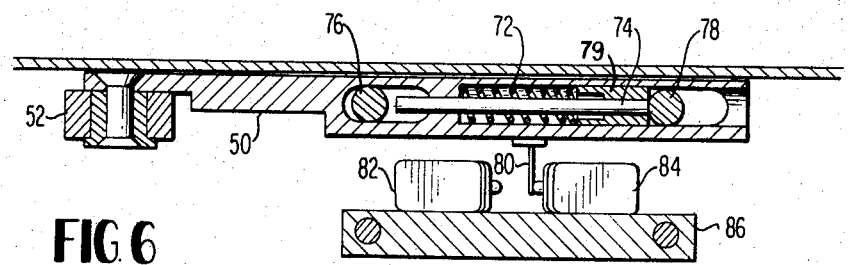
FIG. 6 is a cross sectional view of FIG. 1 taken along the lines 6—6 illustrating a first embodiment of the switch means mounted in the speed controller housing.

Referring now to the drawings wherein like number refer to like parts and more particularly to FIGS. 1 and 2, a thin, low profile speed control assembly 10 is shown including a housing 11, and a clutch and brake mechanism generally referred to by reference numeral 12 connected to a revolving door shaft 14 by means of a stub shaft 16 and gear assembly 17. The gear assembly 17 is comprised of a main gear 18, a pinion gear 20, an intermediate gear 22, another pinion gear 24, a first helical gear 26, and a second helical gear 28. The clutch and brake assembly 12 and the gear assembly 17 are further illustrated and described in greater detail in the above-referenced U.S. Pat. 3,308,912, issued to A. E. Sheckells. An electrical drive motor 30 is coupled by means of a flexible drive shaft assembly 32 to the worm gear 34 forming part of the clutch assembly 12, or directly to the gear train assembly 17. The stub shaft 16 is secured to the main gear 18 by means of key members 36 so that the electric motor 30 is capable of turning the revolving door shaft 14 through the gear assembly 17.

Four door wings 38 are secured to the revolving door shaft 14 in a mutually perpendicular position relative to the control axis of the door shaft. Referring briefly to FIG. 7, which is helpful in understanding the invention, the door wings 38 are adapted to revolve within an enclosure 40 comprised of side walls 42 and 44, the circular width of which is at least equal to the arc subtended by the central angles (90°) described by the four door wings 38. The quarterline position is defined as that position wherein the peripheral airlock strips of all four wings 38 touch the enclosure side walls 42 and 44 with mutually oppositely positioned wing airlocks touching substantially the same point on their respective side walls, as shown.

The subject invention contemplates providing means for stopping the door wings 38, once actuated, by a single user at a quarterline position after a substantially full or complete revolution of the door. Additionally, it is contemplated that once actuated, the door will rotate at a first or relatively high speed for a predetermined part of the complete revolution, for example, one-third revolution, allowing the user to pass through the revolving door to the exit position and then continue rotating at a second or a relatively slow speed for substantially the remainder or two-thirds revolution whereupon the revolving door wings 38 halt at a quarterline position. Although the following description will be made considering a single user, it should be understood that additional override circuitry, not shown, which is well known to those skilled in the art, is utilized in conjunction with the subject stop control circuit when a plurality of consecutive users continually actuate the starting of the revolving door.

The first embodiment of the quarterline stopping apparatus comprises a pair of concentric cams 46 and 48 located on the upper end of the stub shaft 16. The cams 46 and 48 moreover are mounted one on top of the other so that cam 46 is positioned beneath the cam 48. A cam follower 50 is adapted to selectively engage either cam surface 49 or 51 of the cams 46 and 48 or the common cam surface 53 therebetween by means of a roller member 52 connected to the end thereof. The cam follower 50 is mounted on the side of the brake housing 47 (FIG. 1) and is adapted to move back and forth relative to the stub shaft 16 as the cams 46 and 48 are rotated thereby.

Referring now to FIGS. 3, 4 and 5, the cam assembly, including cams 46 and 48, is shown in more detail mounted on the upper portion of the main gear 18 and secured to the stub shaft 16. The lower cam 46 meshes by means of splines 52′ with a sleeve section 54 which is adapted to fit into an axial bore of the stub shaft 16. A worm screw 57 is inserted into a transverse bore 56, as shown by FIG. 4, and coacts with a threaded portion 59 of the sleeve 54. The worm screw 56 provides manual adjustment of the cam 46 relative to the position of the wings 38 without the need for removing the top cover 9 of the controller housing 10 shown in FIG. 1. The other cam 48 is secured to a second sleeve 60 which is adapted to pass through the aforementioned sleeve 54. The upper cam 48 is threaded over the end of the sleeve 54 and is secured thereto by means of a pin 62. The lower portion of the sleeve 54 has a threaded section 64 and a second worm screw 66 is inserted into another transverse bore 67 to engage the threaded section 64. By means of the manual turning of the worm screw 66, the upper cam 48 may be adjusted in a manner similar to that described with respect to cam 46.

The cam 46 includes a raised cam surface 49 which projects beyond the raised surface 51 o fthe cam 46. Such an arrangement produces three distinct positions for the cam follower 50 with transition regions therebetween. For example, the raised cam surface 51 of cam 48 defines a first position of the cam follower 50, hereinafter referred to as the "quarterline stop" position. The raised cam surface 49 of cam 46 defines a second position of the cam follower 50 hereinafter referred to as the "high speed" position, while the cam surface 53 of both cams 46 and 48 which have the same radius define a third position of the cam follower 50 hereinafter referred to as the "slow speed" position. It can be seen, therefore, that as the stub shaft 16 and consequently the door shaft 14 revolve, the cam follower 50 will assume each of the three positions per revolution of the door.

Referring now to FIG. 6, the cam follower 50 and the roller 52 connected thereto as shown in FIG. 1 are illustrated in cross section. Additionally, the cam follower 50 includes spring biasing means mounted internally thereof and comprises a compressional spring 72 and a cylindrical pin 74 attached to a sleeve 79 which is adapted to move between two limit stops 76 and 78. The movement of the follower 50 in one direction further compresses the spring 72 which urges the cam follower 50 and the roller 52 connected thereto into engagement with the cam surfaces of the cams 46 and 48 shown in FIG. 1. A finger-like projection 80 extends outwardly from the cam follower 50 and is adapted to alternately actuate a pair of switches in the form of microswitches 82 and 84 which are mounted on a block 86 adjacent the cam follower 50.

The combination of the cam means including cams 46 and 48 and the operation of switches 82 and 84 by means of the cam follower 50 are utilized to control the drive motor 30 shown in FIG. 1 to rotate the wings 38 at a first or relatively high speed for a first portion of a complete revolution (⅜ rev.) and at a second or relatively slower speed for substantially the remainder of a complete revolution (⅝ rev.), coming to a stop at the quarterline position at substantially the end of a complete revolution just prior to the succeeding starting position which is reached by user actuation either manual or, for example, treadle actuation.

This is further illustrated by reference to FIG. 8 which is a schematic block diagram of the first embodiment of the system. The diagram illustrates the cams 46 and 48 actuating the cam follower 50 such that the element 80 is adatped to operate a pair of single pole, two position switches 82 and 84. Switch 82 is comprised of stationary normally open and normally closed switch contacts 88 and 90, which are used to mechanize the low speed and quarterline stop positions, respectively, as the movable contact member or armature 92 switches therebetween. Switch 84 is comprised of stationary normally closed contact 94 and normally open contact 96 and armature 98. The armature 98 is moved between contacts 94 and 96 by means of the cam follower element 80 to mechanize a circuit return and a high speed position.

The switches 82 and 84 are coupled to the motor control unit having input terminals 102, 104, 106 and 108. The normally closed switch contact 90 of the switch 82 is directly connected to terminal 102 while the normally open contact 88 is directly connected to input terminal 104. The movable contact 98 of microswitch 84 is directly connected to input terminal 106, while the normally open contact 96 is directly connected to input terminal 108 completing the electrical interconnection of the switches 82 and 84. The armature 92 of switch 82 is directly connected to the normally closed switch contact 94.

As illustrated and exaggerated for the purposes of illustration, the cam follower 50 is in contact with cam surface 51 which is the quarterline stop position and the switches 82 and 84 are both unactuated. Upon simultaneous counterclockwise rotation of the cams 46 and 48, the cam follower 50 will move into contact with cam surface 49 to actuate the switch 84 only causing the armature contact 98 to engage switch contact 96 corresponding to the high speed switch position. After the aforementioned predetermined amount of rotation, the cam follower 50 will contact cam surface 53 which is common to both cams 46 and 48, whereupon microswitch 82 is actuated, moving the armature contact 92 into engagement with switch contact 88 corresponding to the low speed switch position. At the end of the low speed period, the follower 50 will again engage the cam surface 51 and the switches 82 and 84 will move to the quarterline stop position. The motor control unit 100 is responsive to the switch positions of switches 82 and 84 to produce an output signal at output terminals 110 and 112 corresponding to the high speed, low speed and quarterline stop positions. The output signals fed to the drive motor correspondingly comprises a first control signal for driving the motor at the relatively high speed, a second control signal to produce a relatively low speed and thirdly, a stop control signal.

Figure 9:
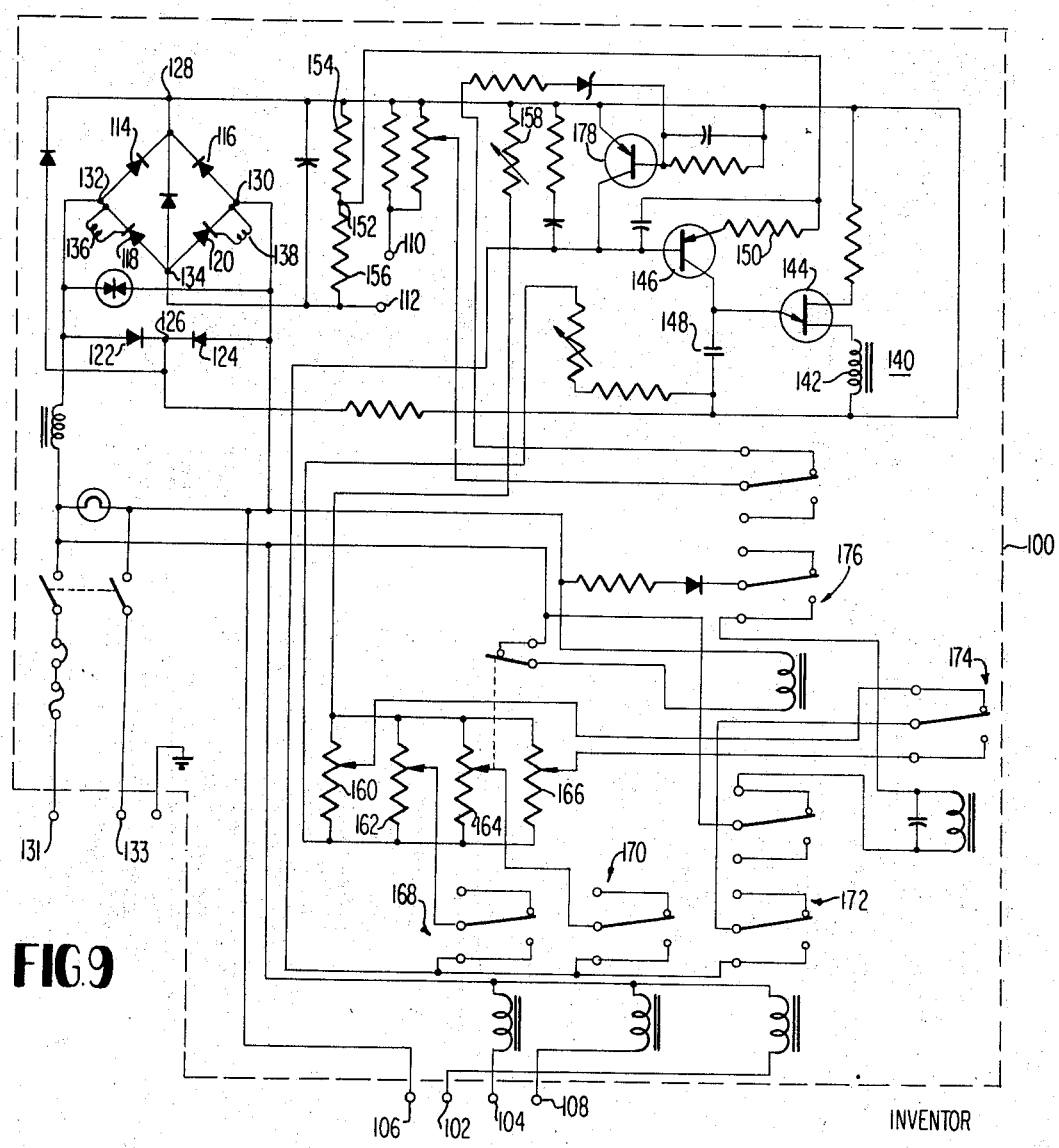
FIG. 9 is an electrical schematic diagram of a motor control unit utilized in combination with the subject invention.

The motor control unit 100 is illustrated schematically in FIG. 9 and includes, inter alia, a gated bridge circuit comprising a pair of semiconductive diodes 114 and 116 and a pair of silicon control rectifiers 118 and 120. Additionally, semiconductive diodes 122 and 124 are also coupled to diodes 114 and 116 in a bridge circuit configuration providing a fixed D.C. output voltage across terminals 126 and 128 when an A.C. line voltage, for example 115 v. A.C., is applied across terminals 130 and 132 via input terminals. A variable D.C. voltage, on the other hand, appears across the opposite terminals 128 and 134 in accordance with the amount of conduction of the silicon control rectifiers 118 and 120. The motor control output terminals 110 and 112 are coupled to the bridge terminals 128 and 134 so that the amplitude of the D.C. voltage thereacross determines the speed at which the motor 30, shown in FIGS. 1 and 2, drive the revolving doors. Thus, for example, if the silicon controlled rectifiers 118 and 120 are rendered conductive for a relatively long length of time, the D.C. voltage appearing at the output terminals 110 and 112 will be correspondingly greater than if they are rendered conductive for a relatively short length of time. Since a silicon controlled rectifier will not conduct until a trigger voltage is applied to its gate electrode, the respective gates are connected to secondary windings 136 and 138 of a transformer 140 whose primary winding 142 is coupled into a base circuit of a unijunction transistor oscillator circuit including unijunction transistor 144. The unijunction transistor oscillator circuit however is not free-running but is controlled by a transistor 146 coupled to its emitter circuit. The unijunction transistor oscillator, moreover, is of a conventional type and is illustrated for example in the General Electric Transistor Manual, third edition, at page 59. The present unijunction oscillator merely substitutes the primary winding 142 for a resistance, while the transistor 146 is substituted for the resistance in the emitter circuit. While transistor 146 is conductive, it will exhibit a resistance the value of which is a function of its conductivity and will cause the unijunction oscillator to produce a pulse output signal across the primary winding 142 which is then coupled to the silicon control rectifiers 118 and 120 via windings 136 and 138. The frequency of the pulsed output from the unijunction oscillator circuit is controlled by the resistance in series with the capacitor 148 which is transistor 146. The conductivity of transistor 146 is conrolled by the voltage appearing at the junction 152 between fixed resistors 154 and 156 coupled across terminals 128 and 134 as well as the base current fed to the base of transistor 146 by means of the variable resistor 158 and the parallelly connected potentiometers 160, 162, 164 and 166, the sliders of which are coupled to the base by means of respective relays 168, 170, 172, 174 and 176. Depending upon which of the relays is energized, the slider contacts of the potentiometers 160–166 are selectively coupled to the base of transistor 146 varying its conductivity.

Therefore, when the microswitches 82 and 84 of FIGS. 6 and 8 are unenergized indicating the quarter line stop positions, relay 172 will be energized through input terminals 102 and 106. The energization of relay 172 will de-energize relay 174 and the unijunction transistor oscillator circuit will not pulse at a sufficiently high enough rate to cause the drive motor 30 to return the door wings 38. However, upon actuation of the door, microswitch 84 will be actuated, causing relay 170 to be energized through input terminals 108 and 106, whereupon transistor 146 is caused to conduct enough to cause the unijunction transistor oscillator to oscillate at a predetermined frequency which will produce a relatively high D.C. potential across terminals 128 and 134 as well as output terminals 110 and 112. In a like manner, when the cam follower 50 causes microswitch 82 to close relay contacts 88 and 92, relay 170 will be de-energized while relay 168 will pick up. This, in turn, will cause a change in base current of transistor 146 thereby causing the unijunction oscillator to oscillate at a relatively lower rate so that a relatively lower D.C. voltage will appear across the output terminals 110 and 112.

A third transistor 178 is coupled into the base of transistor 146 for providing a limiter circuit or protective means for the circuit combination including transistor 146 and the unijunction transistor 144 so that in the event of a malfunction of the transistors, an exceedingly high output voltage will not be allowed to appear across the output terminals 110 and 112.

The circuit configuration shown in FIG. 9 then operates in conjunction with the cams 46 and 48 and the microswitches 82 and 84 for generating the desired drive motor potential at the required portions of each revolution of a revolving door to properly operate and finally stop the drive motor 30 at the quarterline position.

A second embodiment of the present invention comprises a pair of mercury switches substituted for the microswitches 82 and 84, shown with respect to FIGS. 1 through 7. Referring now to FIG. 10 through FIG. 13, a pair of mercury switches 180 and 182 are mounted on a circular base member 184 which is adapted to be rotated by means of the cam follower 50. The rotation is provided by means of a rack and pinion arrangement wherein a rack member 185 is secured to one side of the cam follower 50 while a pinion 186 is attached to the rear of the base member 184 by means of a bolt 187. The mercury switches 180 and 182 are mounted on the base member 184 and are oppositely inclined with respect to one another so that a rotation of the base member will cause the respective mercury pools 183 included internally thereof to move to mutually opposite ends of their containers. This is shown in greater detail with reference to FIG. 13 wherein the mercury switch 180 includes a tube 188 filled with a mercury pool 183 and having circuit contacts 192, 194 and 196. Similarly, mercury switch 182 is comprised of a glass tube 190 having a pool of mercury located therein and additionally includes contacts 202, 204 and 206.

As the cams 46 and 48 rotate, the mercury switches 180 and 182 are rotated both clockwise and counter-clockwise about the central axis of the base member 184 and selected contacts on the tubes 188 and 190 have a circuit closed thereacross by means of the movement of the mercury pools 183 moving from end to end.

Considering the schematic diagram of FIG. 13, contacts 192, 194, 196 of mercury switch 180 and contacts 202, 204 and 206 of mercury switch 182 are adapted to be coupled to the motor control unit 100 shown in FIG. 8. For example, a direct connection is made between contact 202 and terminal 104. A direct connection is made between contact 206 and input terminal 102 as well as direct connections between contacts 196 and terminal 108, and contact 194 and terminal 106. Completing the circuit, a direct connection is made between mercury switch contacts 204 and 192.

In operation, when the cam follower 50 and the roller 52 moves into contact with cam surface 49, the mercury switches 180 and 182 will be rotated counter-clockwise such that the mercury pool 183 of switch 180 will effect a closed circuit between contacts 194 and 196 while opening the circuit between contacts 204 and 206. As the roller 52 continues its travel, it will next come into contact with cam surface 53 indicative of a low speed position and mercury switches 180 and 182 will be rotated clockwise causing the mercury switch 182 to close the circuit between contacts 202 and 204. Finally, at the quarterline stop position as shown, the roller 52 is in contact with cam surface 51 and the mercury switches 180 and 182 effect a closed circuit between contacts 194 and 206. The motor control unit 100 will produce the same motor control signals for driving the drive motor 30 as described with respect to microswitches 82 and 84.

What has been shown and described therefore is a quarterline stop control system for revolving doors including cam means coupled to and revolving with the door shaft with a cam follower mechanism actuating switch means mounted interiorly of the speed control housing, with the switch means being actuated in response to the cam rotation to provide a first or high speed movement of the revolving doors for a predetermined portion of the complete revolution of the doors and a second or relatively lower speed for another predetermined portion of the door revolution with an automatic stop occurring at the quarterline position after a substantially complete revolution of the door shaft and wings attached thereto.

While there has been shown and described what is at present considered to be the preferred embodiment of the invention, modifications will readily occur to those skilled in the art. It is not desired therefore that the invention be limited to the specific arrangements shown and described but it is to be understood that all equivalents, alterations and modifications within the spirit and scope of the present invention are herein meant to be included.

I claim:

1. A revolving door operating mechanism having a clutch assembly as well as a speed control mechanism, including a housing, for driving the door shaft of a revolving door from an electrical drive motor, the improvement comprising: a pair of single-pole, two position switches having at least three switch positions; a pair of switch actuator cams connected to said door shaft adjacent each other and being moved in accordance with the rotation thereof; cam follower means adapted to contact said cams and being moved in accordance with the rotation of the door shaft to operate said switches to effect said three switch positions to define first and second predetermined angular portions of a complete door revolution and a quarterline stop position of the door, motor control circuit means coupled between said pair of switches and said drive motor for generating motor control signals in response to the three switch positions of said switches, and said switches adapted to be actuated to a first switch position to operate said motor control circuit means to generate a first control signal for running said drive motor at a first selected speed for said first predetermined angular portion of a door revolution, to a second switch position to operate said motor control circuit means to generate a second control signal for running said motor at a relatively lower speed for said second predetermined angular portion of a door revolution prior to reaching the quarterline stop position, and to a third switch position to operate said motor control circuit means to generate a stop control signal for deactivating said drive motor at the quarterline stop position.

2. The invention as defined by claim 1 wherein said door operating mechanism includes a stub shaft in said housing coupling said revolving door shaft to said clutch and speed control assembly and including means for mounting and securing said pair of cams one on top of the other along the central axis of said stub shaft with means for mechanically adjusting the position of said pair of cams relative to a selected angular position of said door shaft and said revolving door.

3. The invention as defined by claim 2 wherein said pair of single-pole, two position switches are mounted adjacent said cam follower means and wherein said cam follower means includes means for alternately actuating said pair of switches in response to the rotation of said pair of cams.

4. The invention as defined by claim 1 wherein said cam follower additionally includes a rack member and wherein said pair of switches comprises a pair of mercury switches mounted on a base member rotatable about its control axis, said base member including a pinion secured thereto and engaging said rack member so that rotation of said mercury switches is produced by said cam follower means in response to the rotation of said pair of cams.

5. The invention as defined by claim 1 wherein said pair of switches comprise mercury switches.

6. A revolving door operating mechanism for a revolving door assembly including a door casing comprising opposite walls having their edges spaced from each other to provide entry and exit openings including a door shaft and radial door wings mounted thereon for rotation in said casing, the revolving door operating mechanism having an electric motor connected to drive the door shaft through a clutch assembly and a speed control mechanism, the improvement comprising cam means connected to said door shaft and being moved in accordance with the rotation thereof and having at least three sequentially arranged cam surface displacement positions, one of said cam surface positions defining a first predetermined angular portion of a complete door revolution, a second of said cam surface positions defining a second predetermined angular portion of a complete door revolution, and the third said cam surface position defining a quarterline stop position of the door wherein the edges of the door wings are aligned with the edges of said casing at the entry and exit openings, switch means having at least three operative switch positions and connected to be sequentially actuated to the three positions respectively by said three cam surface displacement positions on rotation of the door motor control circuit means coupled between said switch means and said electric motor for generating different motor control signals in response to said three switch positions, and the first switch position connected to operate said motor control circuit means to generate a first control signal to run said motor at a first selected speed for said first predetermined angular portion of the door revolution, the second switch position connected to operate said motor control circuit means to generate a second control signal to run said motor at a relatively lower speed for said second predetermined angular portion of the door revolution prior to reaching the quarterline stop position, and the third switch position connected to operate said motor control circuit means to generate a stop control signal to deactivate said motor at the quarterline stop position.

7. The invention as defined by claim 6 wherein said switch means is mounted on said speed control mechanism.

8. The invention as defined by claim 6 wherein said switch means is located interiorly of said speed control mechanism.

9. The invention as defined by claim 6 wherein said cam means includes means for manually adjusting the position of said cam means relative to a selected angular position of said door shaft.

10. The invention as defined by claim 6 wherein said switch means comprises a first and a second mercury swtich.

11. A revolving door operating mechanism for a revolving door assembly including a door casing comprising opposite walls having their edges spaced from each other to provide entry and exit openings, a door shaft and radial door wings mounted thereon for rotation in said casing, the revolving door operating mechanism having an electric motor connected to drive the door shaft through a speed control assembly, the improvement comprising switch means having at least three operative switch positions, cam means connected to said door shaft and positioned relative to said switch means during rotation of said door shaft to define a first predetermined angular portion of a complete door revolution, a second predetermined angular portion of a complete door revolution, and a quarterline stop position of the door wherein the edges of the door wings are aligned with the edges of said casing at the entry and exit openings, said switch means connected to be sequentially actuated to the three switch positions by rotation of said cam means respectively to said first and second angular portions and said quarterline stop position on rotation of the door through a door revolution, motor control circuit means coupled between said switch means and said electric motor for providing different motor control signals in response to said three switch positions, and the first switch position connected to operate said motor control circuit means to connect a first control signal to run said motor at a first selected speed for said first predetermined angular portion of the door revolution, the second switch position connected to operate said motor control circuit means to provide a second control signal to run said motor at a relatively lower speed for said second predetermined angular portion of the door revolution prior to reaching the quarterline stop position, and the third switch position connected to operate said motor control circuit to deactivate said motor and stop the revolving door at the quarterline stop position.

References Cited

UNITED STATES PATENTS

| | | | |
|---|---|---|---|
| 2,954,971 | 10/1960 | Simpson | 49—43 |
| 3,041,480 | 6/1962 | Holzer | 318—466 |
| 3,307,660 | 3/1967 | Sheckells | 49—43 |
| 3,308,912 | 3/1967 | Sheckells | 49—43 |
| 3,349,876 | 10/1967 | Sheckells | 49—43 |
| 3,364,620 | 1/1968 | Hess | 49—43 |

ORIS L. RADER, Primary Examiner

A. G. COLLINS, Assistant Examiner

U.S. Cl. X.R.

49—43